US009922500B2

(12) United States Patent
Montgomery et al.

(10) Patent No.: US 9,922,500 B2
(45) Date of Patent: Mar. 20, 2018

(54) METHOD AND SYSTEM FOR SIDE WAGERING

(71) Applicant: Bally Gaming, Inc., Las Vegas, NV (US)

(72) Inventors: David Montgomery, David (AU); David Jacques, L'Ancienne Lorette (CA)

(73) Assignee: Bally Gaming, Inc., Las Vegas, NV (US)

(*) Notice: Subject to any disclaimer, the term of this patent is extended or adjusted under 35 U.S.C. 154(b) by 0 days.

(21) Appl. No.: 15/252,137

(22) Filed: Aug. 30, 2016

(65) Prior Publication Data

US 2017/0169667 A1 Jun. 15, 2017

Related U.S. Application Data

(63) Continuation-in-part of application No. 14/979,216, filed on Dec. 22, 2015.

(60) Provisional application No. 62/096,306, filed on Dec. 23, 2014.

(51) Int. Cl.
*G06F 17/00* (2006.01)
*G07F 17/32* (2006.01)

(52) U.S. Cl.
CPC ...... *G07F 17/3288* (2013.01); *G07F 17/3211* (2013.01); *G07F 17/3223* (2013.01); *G07F 17/3258* (2013.01); *G07F 17/3269* (2013.01); *G07F 17/3272* (2013.01)

(58) Field of Classification Search
None
See application file for complete search history.

(56) References Cited

U.S. PATENT DOCUMENTS

| | | | |
|---|---|---|---|
| 4,861,041 | A | 8/1989 | Jones et al. |
| 5,098,107 | A | 3/1992 | Boylan et al. |
| 5,174,579 | A | 12/1992 | Griffiths |
| 5,288,077 | A | 2/1994 | Jones |
| 5,356,140 | A | 10/1994 | Dabrowski et al. |
| 5,377,993 | A | 1/1995 | Josephs |
| 5,390,934 | A | 2/1995 | Grassa |
| 5,393,067 | A | 2/1995 | Paulsen et al. |
| 5,417,430 | A | 5/1995 | Breeding |
| 5,472,194 | A | 12/1995 | Breeding et al. |
| 5,577,731 | A | 11/1996 | Jones |
| 5,632,485 | A | 5/1997 | Woodland et al. |
| 5,636,843 | A | 6/1997 | Roberts |
| 5,649,705 | A | 7/1997 | String |

(Continued)

FOREIGN PATENT DOCUMENTS

| | | |
|---|---|---|
| CA | 2 243 738 | 1/2000 |
| CA | 2472735 | 1/2005 |
| CA | 2516025 | 3/2006 |

*Primary Examiner* — Paul A D'Agostino
(74) *Attorney, Agent, or Firm* — TraskBritt

(57) ABSTRACT

A side wagering system for table games includes a table controller, a dealer interface and at least one player interface, the at least one player interface including a first wager area and at least one second wager area that permits a player to place first, second or one or more third supplemental wagers for the opportunity to win corresponding first, second or one or more third awards, such as a first, a second or a third progressive jackpot. The table controllers or multiple tables may be linked to a common award server.

7 Claims, 7 Drawing Sheets

(56) References Cited

U.S. PATENT DOCUMENTS 5,673,917 A 10/1997 Vancura
5,707,285 A 1/1998 Place et al.
5,732,950 A 3/1998 Moody
5,743,800 A 4/1998 Huard et al.
5,791,989 A 8/1998 Slinkman
5,816,575 A 10/1998 Keller
5,839,730 A 11/1998 Pike
5,851,011 A 12/1998 Lott
5,924,926 A * 7/1999 Brown ................ A63F 3/00157 273/292
5,984,308 A 11/1999 Herrmann
6,139,430 A 10/2000 Huard et al.
6,146,270 A 11/2000 Huard et al.
6,158,741 A 12/2000 Koelling
6,299,534 B1 10/2001 Breeding et al.
6,325,375 B1 * 12/2001 Potter ................. A63F 3/00157 273/292
6,346,044 B1 * 2/2002 McCrea, Jr. .............. A63F 1/18 273/292
6,481,718 B2 11/2002 Koelling
6,517,073 B1 2/2003 Vancura
6,607,195 B2 8/2003 Vancura
6,854,731 B2 2/2005 Saucier
D594,912 S 6/2009 Hall et al.
8,740,692 B2 6/2014 Yoseloff et al.
2002/0089120 A1 * 7/2002 Miller ................. A63F 3/00157 273/274
2004/0061288 A1 * 4/2004 Snow .................. A63F 3/00157 273/274
2005/0258597 A1 11/2005 Soltys et al.
2007/0111786 A1 * 5/2007 Snow ...................... G07F 17/32 463/27
2008/0125211 A1 * 5/2008 Plowman ................ G07F 17/32 463/20
2008/0146344 A1 6/2008 Rowe et al.
2008/0248849 A1 * 10/2008 Lutnick ................... G07F 17/32 463/16
2009/0111573 A1 4/2009 Iddings
2013/0116032 A1 * 5/2013 Lutnick ............... G07F 17/3276 463/17
2014/0087805 A1 * 3/2014 Snow .................. G07F 17/3223 463/13
2014/0087806 A1 * 3/2014 Snow .................. G07F 17/3293 463/13

* cited by examiner

METHOD AND SYSTEM FOR SIDE WAGERING

CROSS-REFERENCE TO RELATED APPLICATIONS

This application is a continuation-in-part of U.S. patent application Ser. No. 14/979,216 which was filed on Dec. 22, 2015, now U.S. Pat. No. 9,858,752, issued Jan. 2, 2018, which application claims priority to U.S. Provisional Patent Application Ser. No. 62/096,306 which was filed on Dec. 23, 2014, the contents of which are incorporated by reference.

TECHNICAL FIELD

This innovation relates to wagering games and playing devices and, in particular, a gaming table with two or more wagering areas which establish three or more wager options.

BACKGROUND

The disclosed embodiments relate to side wagering, such as side wagering associated with a base wagering game. More specifically, the disclosed embodiments relate to a system that offers multiple side wagers and different awards associated with those side wagers.

Casinos may often offer side wagering during the course of play of a base game to casino patrons. Side wagering is offered to increase the excitement of the base game by increasing a potential payout for a winning outcome related to or independent from the base game. In this manner, side wagering may generate increased interest in the base wagering game. This increased interest in the base wagering game may encourage more players to play the base game.

Side wagering during the course of the base game is also beneficial to a casino by increasing overall wagers from players. Further, the added excitement may encourage more players to play the base game, and may encourage players to play the base game for longer periods of time than they otherwise would.

However, such side wagering may also have the undesirable effect of slowing down the play of the base wagering game. That is, when casinos offer side wagering, added time may be involved to place and resolve side wagers. This in turn leads to a fewer number of base games played at a gaming table during a predetermined period of time. Side wagering is thus often limited in options and outcomes for players in order to avoid the above drawbacks. However, by limiting side wagering in this manner, the full benefits and excitement that potentially could be gained by side wagering are not achieved. Thus, there is a need to allow for side wagering during a base wagering game that may be done quickly and efficiently while also maintaining a dynamic flexibility for the player.

BRIEF SUMMARY

The disclosed embodiments have been developed in light of the above and aspects of the invention comprise a side or supplemental wagering system and side or supplemental wagers and associated awards. In one embodiment, a system comprises at least one game table having an associated table controller, at least one dealer interface, at least one player interface, and one or more displays. The at least one player interface preferably comprises at least two side wagering areas. The at least two or more side wagering areas each have a detector or sensor that determines whether a side wager has been placed by a player at a wagering area. The dealer interface and the player interface are communicatively connected to the table controller.

In a preferred embodiment, the system includes multiple individual table systems that are linked, such as via a central server that has a processor and memory. The table controllers may report supplemental wagering activities to the central server and receive information from the server.

In a preferred embodiment, the supplemental wagering system offers a player different supplemental wagers via at least two wagering areas, and offers three or more different awards corresponding to the three or more different supplemental wagers. The different awards may comprise different portions of a single jackpot, such as a single progressive jackpot, or different jackpots, such as different progressive jackpots.

In one exemplary embodiment, there is a side wagering system comprising at least one game table including a table controller, a dealer interface and at least one player interface. The player interface includes at least two wagering areas where each wagering area may have a wager detector that determines when a side wager has been placed by a player at that wagering area. A player may place a wager at individual ones of the at least two wagering areas or at more than one of the at least two wagering areas. The dealer interface and the player interface are connected to the table controller.

The system further includes an award server including a processor and memory. The award server may be configured to generate at least one first award corresponding to a wager placed relative to an individual one of the wagering areas and at least one second award corresponding to wager placed relative to at least one combination of two or more wagering areas.

The table controller may determine whether a player placed a wager at one or more of the at least two wagering areas. If one or more winning criteria have been met, the award server is configured to award the at least one first award or the at least one second award to the player depending upon the wager placed by the player.

In further embodiments, the at least one player interface comprises a first wagering area and a second wagering area. A player may place a first wager relative to the first wagering area, a second wager relative to the second wagering area, or a third wager comprising the first wager and the second wager. The award server is configured to generate a first award corresponding to the first wager, a second award corresponding to the second wager and a third award corresponding to the third wager.

In some embodiments, the third wager is of an amount that is greater than the second wager, which, in turn, is greater than an amount of the first wager. The corresponding third award is an amount that is greater than the second award, which, in turn, is an amount which is greater than the first award.

In some embodiments, the first, second and third awards comprise progressive jackpots. The award server may be configured to generate a first pool value, a second pool value and a third pool value. The first award may comprise the first pool value, the second award may comprise the sum of the first pool value and the second pool value, and the third award may comprise the sum of the first pool value, the second pool value and the third pool value.

In further embodiments, the at least two wagering areas comprise a first wagering area, a second wagering area and a third wagering area. In this case, the award server is configured to generate a first award relative to a wager placed at the first, second, or third wagering areas and at least one second award relative to a wager placed at combinations of the first, second and/or third wagering areas. The first award may be different for each of the first, second and third wagering areas. Similarly, the second award may be different for different combinations of the first, second, and third wagering areas.

In another exemplary embodiment, there is a gaming table comprising a table controller that includes a processor for executing machine readable instructions and at least one memory, a dealer interface communicatively coupled to the table controller, the dealer interface comprising at least one input, and a player interface communicatively coupled to the table controller, the player interface comprising at least one input. The table further comprises at least two wagering areas corresponding to the player interface. The wagering areas may comprise a wager detector communicatively coupled to the table controller. The wager detector may determine when a side wager has been placed by a player at the wagering area. A player may place a wager relative to individual ones of the at least two wagering areas and relative to more than one of the at least two wagering areas. In this manner, side wagers of three or more differing amounts may be made by the player via the at least two wagering areas.

The table controller may determine whether the player placed a wager at one or more of the at least two wagering areas via information received from the wagering areas and determining which of the three or more differing amounts was wagered. When one or more winning criteria have been met, the table controlling awards an award to the player depending upon the amount wagered by the player.

The table controller may further comprise a transceiver that is communicatively coupled to an award server. An award amount may be determined via information received from the award server. The table may further comprise at least one display, the display being configured to present award information to the player related to the side wager. The award information may be for a progressive jackpot award amount for each of the three or more differing wager amounts.

In some embodiments of the gaming table, there are two wagering areas and three differing wager amounts. In other embodiments, there are three wagering areas and seven differing wager amounts. The wagering areas may further comprise at least one of a visual and audio indicator, the at least one of the visual and audio indicator providing a first feedback indication that a side wager has been detected and a second feedback indication that a side wager has been "locked in" for a wagering game. The at least one visual and audio indicator may be one or more LED lights.

In another exemplary embodiment, a method of accepting a side wager at a gaming table is provided. The gaming table may comprise at least two side wagering areas that each have a wager detecting device, and a table controller comprising a processor executing machine readable instructions stored on at least one memory. The method may comprise detecting at a first wagering area via a first wager detecting device whether a wager is placed by a player at the first wagering area, and transmitting results as first data to the table controller. The method may also include the step of detecting at a second wagering area via a second wager detecting device whether a wager is placed by a player at the second wagering area and transmitting results as second data to the table controller. Based on the first and second data received from the first wager detector and the second wager detector, the table controller determines whether a first wager, a second wager, or a third wager is placed by the player.

The first wager may correspond to the player placing a wager on the first wagering area, the second wager may correspond to the player placing a wager on the second wagering area, and the third wager may correspond to the player placing a wager on both the first wagering area and the second wagering area. In some instances, the third wager is equal to the sum of the first and the second wagers. In other instances, the third wager is a value other than the sum of the first and the second wagers.

The first wager, the second wager, or the third wager may be locked in for a wagering game after a predetermined amount of time to receive wagers. In some embodiments, the wager detecting device comprises an input device configured to receive an input from the player.

Further objects, features, and advantages of the present invention over the prior art will become apparent from the detailed description of the drawings which follows, when considered with the accompanying drawing figures.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a side or supplemental wagering system that offers multiple wagering opportunities and multiple awards. The system may be implemented in association with one or more gaming tables at which one or more games are presented, such as one or more live table or base games. Such table or base games may comprise a game of Poker or poker-derivative-type games, Blackjack, Baccarat, or various other card, dice, wheel or other games now known or later developed. Further, such games may comprise a main portion and/or one or more sub-portions or features, such as a Blackjack game and an associated side poker feature, etc., wherein the side or supplemental wagers of the invention may relate to the base game to sub-portions or side portions of the game.

In one embodiment, the system allows players to place a side or supplementary wager, such as to one or more base or main wagers. In one embodiment, one or more main or base wagers are required for the player to play one or more table or base games. The system allows the player to place a supplementary wager to the main or base wager(s), where the supplementary wager offers the player the opportunity to win an associated award. The associated award may comprise at least part of a progressive jackpot. As described below, in a preferred embodiment of the invention, the system offers a player the opportunity to place one of three supplementary wagers, wherein each wager offers the player an opportunity to win a different award, such as at least a portion of a different progressive jackpot.

The system further allows the side wagering game or opportunity to be presented at multiple gaming tables by interconnecting the various tables. Supplemental wagering game information from each table may be collected and used to determine jackpots, winners and/or be stored or otherwise utilized for various purposes, such as to generate various reports. The interconnection of the various components may be accomplished via secure connections to protect player information and to avoid fraudulent activity.

Figure 1:
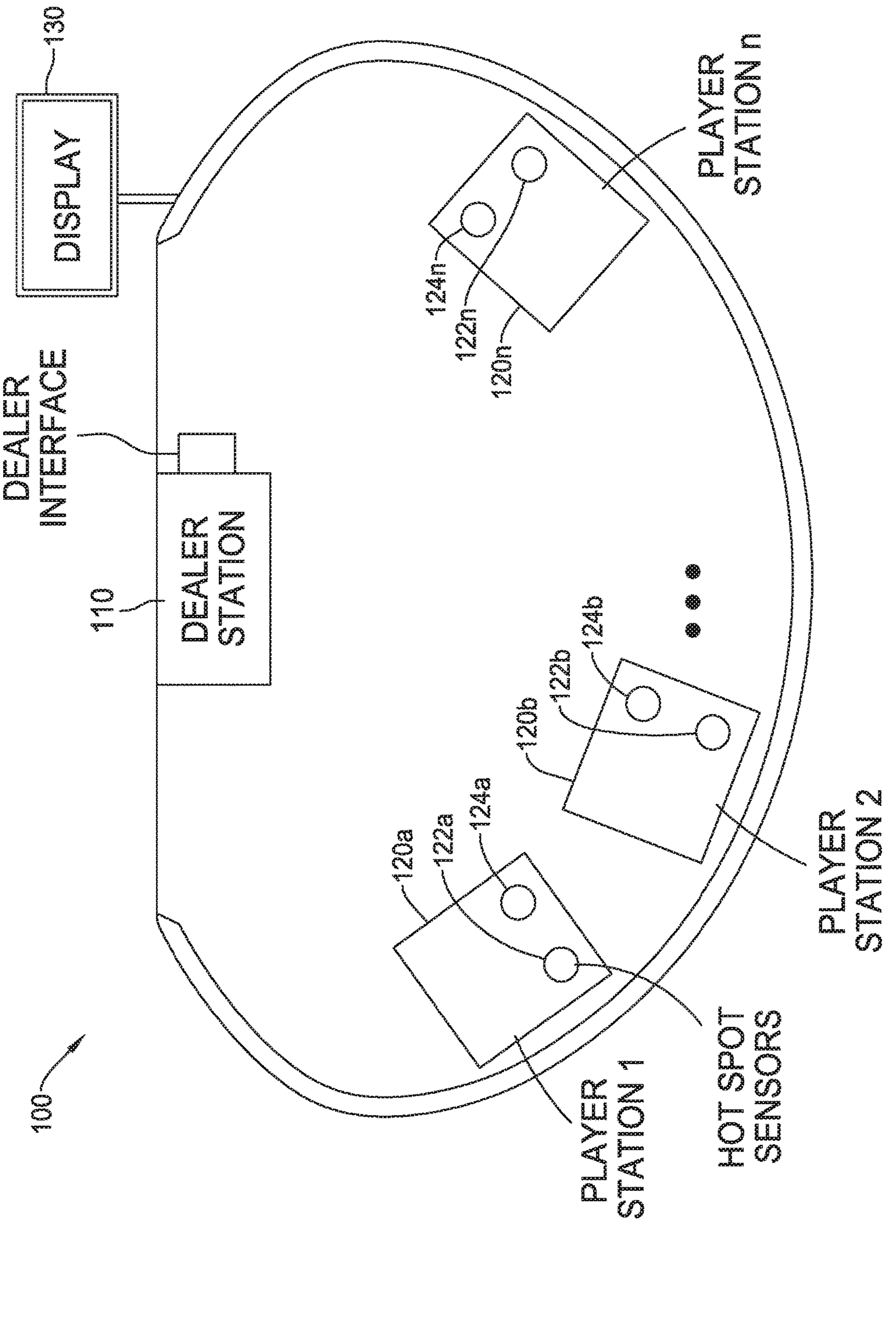
FIG. 1 is an example of a gaming table with progressive side wagering according to one embodiment of the invention.

FIG. 1 is an example of a gaming table according to one embodiment of the invention. A gaming table 100 includes a playing surface with at least one dealer interface 110 and at least one player location or interface 120. In a preferred embodiment, the gaming table 100 includes a plurality of player locations or interfaces 120*a*-120*n*. It will be appreciated that the shape, size and various other characteristics of the table may vary. For example, the gaming table 100 may include a raised playing surface which has a dealer side and an opposing player side and may be covered with felt or other material.

The table 100 may further include one or more displays 130. Such displays 130 preferably comprise electronic video displays, such as CRT, LCD, LED, plasma, DLP or other types of displays. The table 100 and each of its components are preferably controlled by a table controller 210 (see FIG. 2). In one embodiment, the table controller 210 is located at, or adjacent to, the table 100. For example, the table controller 210 might be located in a secure area beneath the table 100. The table controller 210 may have various configurations, such as comprising a controller (such as with embedded instructions and/or for executing machine readable code), one or more memory or data storage devices and one or more communication interfaces.

The dealer interface 110 comprises a device by which the dealer may interface with the system, such as to control the game process and, in particular, the supplemental wager and award process. The dealer interface 110 is connected to the table controller 210 via a communication link and displays game play information to the dealer. The dealer interface 110 may thus include one or more displays. The dealer interface 110 may also include at least one input through which the dealer controls game operations. The one or more inputs may comprise buttons, touch-screens, etc.

The table 100 has a plurality of player interfaces 120*a*-120*n* via which players may participate in a game play, such as by receiving game elements (cards, etc.), placing wagers, and so forth. The player interfaces 120*a*-120*n* may include printed or displayed game areas or instructions. In a preferred embodiment, the player interfaces 120*a*-120*n* each include at least two side or supplemental wagering areas. In the embodiment illustrated, the player interfaces 120*a*-120*h* include two side or supplemental wagering areas 122, 124. However, as described below, the player interfaces 120*a*-120*h* may include more than two side or supplemental wagering areas, such as three or more. The side or supplemental wagering areas 122, 124 comprise one or more sensors to detect a side wager from a player at the player station 120.

In this embodiment, the side wagering areas 122, 124 may comprise one or more of an NFC, RFID, pressure, light, or other sensor to detect the presence of a wager made by a player. For example, the player may place a casino chip on one or more of the side wagering areas 122, 124. The sensor in the area 122, 124 detects the presence of the casino chip and, therefore, determines whether or not the player has placed a side wager. Alternatively, the side wagering areas may comprise a button that is pressed or touched by a player to place a wager.

The side wagering areas 122, 124 may include other features such as lighting. For example, each side wagering area 122, 124 may include one or more colored LED lights (backlights, peripheral lights, etc.) that activate when the sensor detects that the player has made a side wager. Further, the LED light(s) may flash to indicate that the side wager has been detected, and may stay lit once a dealer has started the game play, indicating that a particular side or supplemental wager has been accepted and locked in. The side wagering areas 122, 124 may have multiple colors of LED lights that change colors if more than one side wagering area 122, 124 detects the presence of a wager by the player. The side wagering areas 122, 124 may also have any number of other light sources instead of the LED lights mentioned above, now known or later developed.

As indicated above, the table further includes at least one display 130. The display 130 is configured to display game play information, such as information concerning a side wager and/or awards/jackpots offered or awarded by the system. For example, the display 130 may indicate instructions for participating in the progressive side wager, a current amount of one or more progressive jackpots, and/or an indication of one or more winners of a progressive jackpot at the table 100.

During development it was determined that table space for wager areas is a premium and thus space is limited to add in more wager areas. This is particularly true for games which utilize a large portion of the table for cards or other wager areas. In addition, assuming tables are full of players, by placing another player at the table increases revenue for the casino by increasing the number of players at a table. Changing a six-player table to a seven-player table increases revenue by ⅙, which is significant. Or, if the table size is reduced, more tables may be fit on the casino floor, resulting in increased revenue. More efficiently using and expanding wagering options within the same table space allows these changes to be made.

As discussed herein, the wagering areas 122, 124 may be used for determining or designing the amount wagered by the player or which wagers are made by the player. For example, to designate a first bet option the player would place a wager on only the first wager area 122, to wager on the second wager option the player would place a wager on only the second wagering area 124, and to designate the third wager option the player would wager on both the first and second wager areas 122, 124. Thus using only two wager areas 122, 124 there is provided four wager options, namely no wager, a first wager option, a second wager option, and a third wager option. This could be mapped to a wager to win a first progressive award, a wager to win a second progressive award, a wager to win a third progressive, or no progressive wager. Thus, with only two bet spots, four different betting options are enabled.

In addition, the different wager areas 122, 124 may designate an amount wagered. For example, a wager on the first wager area 122 may represent a first wager amount, a wager on the second wager area 124 may represent a second wager amount, a wager on both the first and second wager areas 122, 124 may represent a third wager amount. No wagers on the first or second wager area 122, 124 represents no side or bonus wager was placed by the player. As stated above, this provides more wagering options for the player and enables more complex game play while using minimal game table space.

It is also contemplated that additional wager areas may be used in addition to the wager areas 122, 124. For example, if a third wager area (not shown) were added to the table, then this would enable or provide the option for eight different wager options. This may be represented as 2 to the $3^{rd}$ power ($2^3$). More than two wager areas 122, 124 may be used up to any number of wager areas with there being established a greater number of wager options or outcomes than wagers areas on the table.

Figure 2:
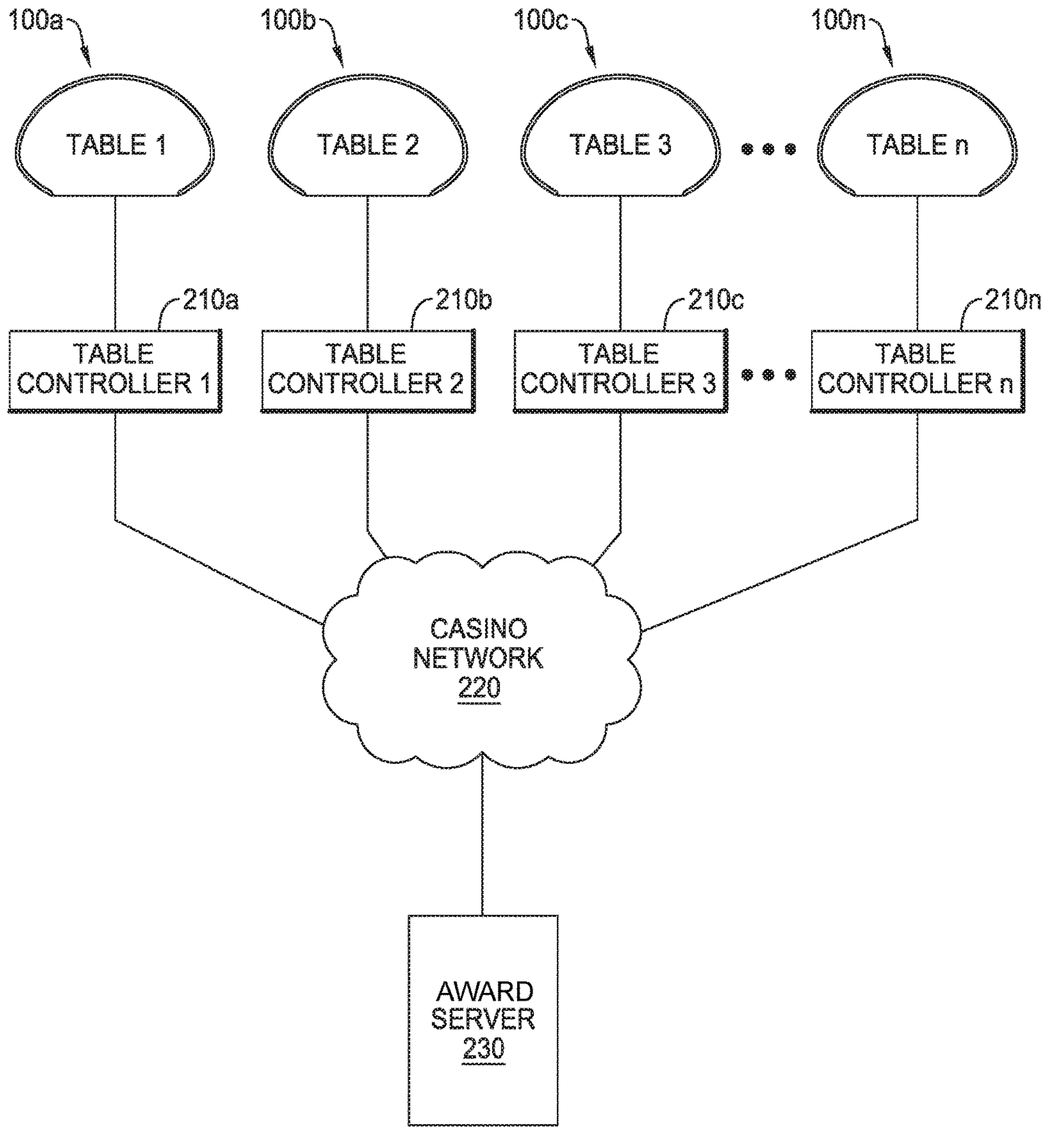
FIG. 2 is a network of game tables for a progressive side wagering system for a multi-level jackpot according to one embodiment of the invention.

FIG. 2 illustrates a network of game tables for a progressive side wagering system according to one embodiment of the invention. As shown in FIG. 2, there may be a plurality of tables 100*a*-100*n* in a gaming environment, such as on a casino floor. As explained above, the various components of each table 100 are preferably interfaced to a table controller 210, such as to be controlled by that table controller 210 and send information to or receive information from, that controller. For example, the table controller 210 is connected to the various components of the table 100 to receive inputs from the dealer and players and to control the flow of the game play. The table controller 210 also controls the side wagering system as described herein. The table controller 210 comprises at least a processor for executing machine readable instructions such as software and a memory for storing program instructions, game data, and/or other data.

Each table controller 210*a*-210*n* is connected through one or more communications links, such as a system network 220, which may be dedicated or comprise all or a portion of an existing casino communication network to communicate with one or more main servers, such as an award server 230. The award server 230 may handle all game logic for the side wagering system. The award server 230 may have various configurations, such as comprising a computing device having one or more processors for executing machine readable instructions, one or more memory or data storage devices, and one or more communication interfaces for transmitting information to or receiving information from remote devices or systems. Workstations, printers or other devices may interface with the award server 230, such as for managing the system, obtaining reports and the like.

In accordance with the invention and as described further below, the system is configured to offer a player multiple supplemental wagering options or opportunities. The system is also configured to offer multiple award opportunities, and most preferably a different award opportunity corresponding to each wager opportunity. In the preferred embodiment, the system offers players three different supplemental wagering opportunities and three associated award opportunities. In one embodiment, the award opportunities comprise all or a portion of a jackpot, and most preferably a progressive jackpot or award (e.g., an award or jackpot having a value that increases at one or more times over time).

Figure 3:
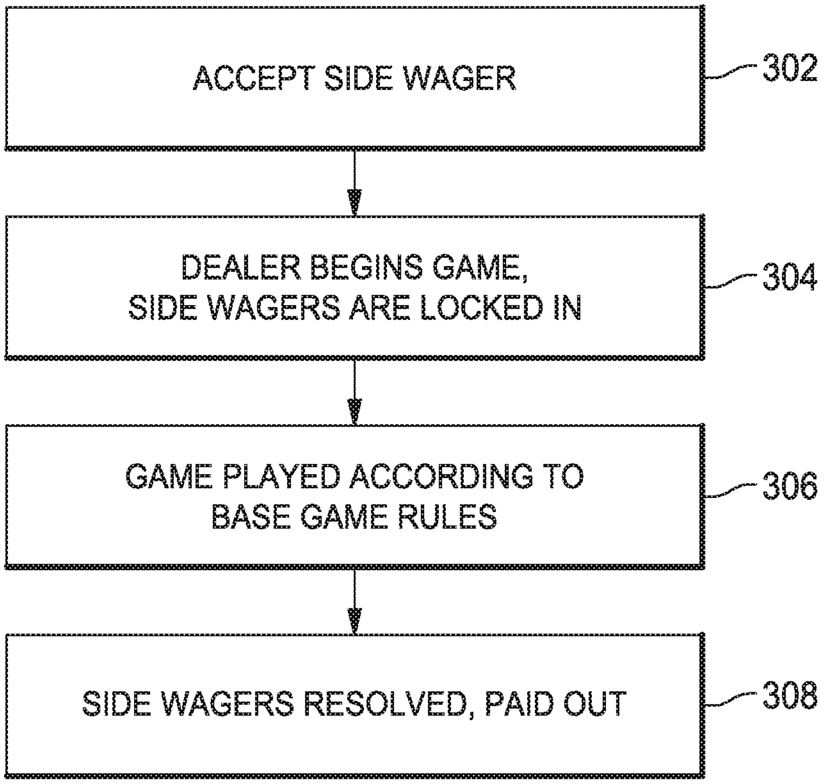
FIG. 3 is a process flow for conducting a progressive side wager for a multi-level jackpot according to one embodiment of the invention.

FIG. 3 is a process flow for implementing a progressive side wager according to one embodiment of the invention. As shown in FIG. 3, at one or more times, players may place a side wager, as in step 302. In one embodiment, players must place their side wager during a designated time period, such as before a base or table game is initiated.

In one embodiment, players may place a side wager on one or more of the side wagering areas 122, 124 on the table 100. The at least two side wagering areas 122, 124 allow the player to place different side wagers and thus, as described herein, play for different awards. Advantageously, in one embodiment of the invention the at least two wagering areas 122, 124 as shown in FIG. 1 allow a player to place at least three different wagers, and thus play for three or more different awards. That is, in an embodiment where two wagering areas are provided, the player may place a first wager on a first wagering area 122 to play for a first award, may place a second wager on a second wagering area 124 to play for a second award, or may place both the first wager and second wager on the at least two wagering areas 122, 124 (thus generating a "third wager") to play for a third award. In one embodiment a wager on only the first wager area 122 qualifies the player to win a low or first award amount. A wager on only the second wager area 124 qualifies the player to win a medium or second award amount. If the wager amount on the second wager area is larger than the wager amount on the first wager area, then the medium or second award may also be larger, assuming the odds are the same. A wager on the first wager area 122 and the second wager area 124 qualifies the player to win a high or third award amount. Because both the first wager and second wager are placed, the medium or second award amount is larger than the first award amount and the second award amount (cumulatively). The high or third award amount may be the sum of the low (first) award amount and the medium (second) award amount.

Figure 4:
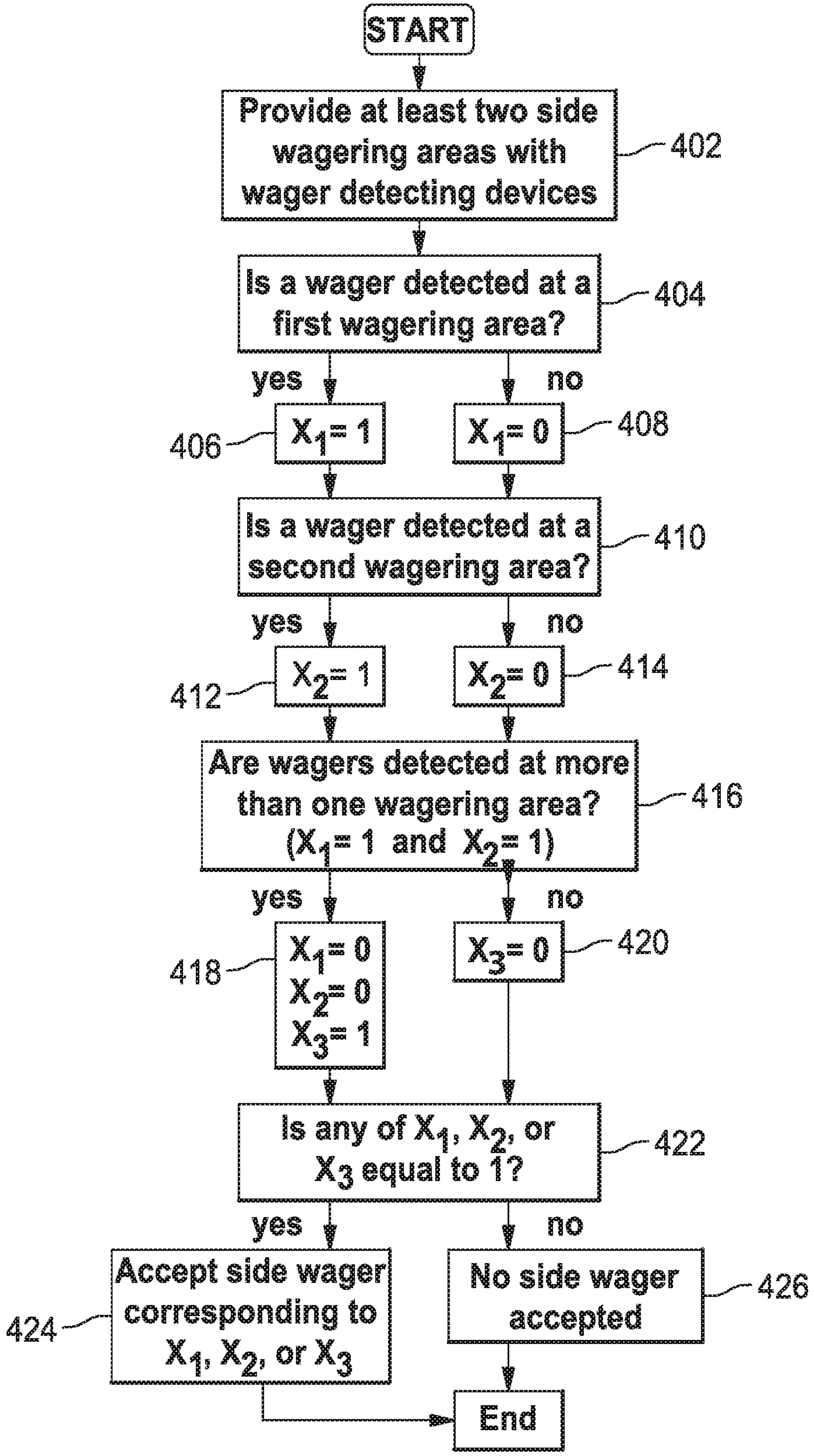
FIG. 4 is a process flow for accepting one or more progressive side wagers for a multi-level jackpot according to one embodiment of the invention.

An example of this is explained with reference to FIG. 4. FIG. 4 shows an exemplary process for detecting one of the multiple wagers via the wagering areas. As explained above, at least two side wagering areas are provided in step 402. The side wagering areas are equipped with wager detecting devices as previously mentioned. In order to determine the value of a side wager placed by a player, the process determines whether a wager is detected at a first wagering area in step 404. This may be done by a player placing a chip on a wagering area, activating an input device at a wagering area, or the like.

When the first wagering area detects that a wager has been placed on the wagering area, a flag $X_1$ is set equal to 1 in step 406. Flag $X_1$ corresponds to a side wager of a first amount as will be explained below. On the other hand, when no wager is detected at the first wagering area, the flag $X_1$ is set to 0 in step 408.

A similar process is also performed for a second wagering area. That is, it is determined whether a wager is detected at a second wagering area in step 410 in a similar manner as the first wagering area explained above. When the second wagering area detects that a wager has been placed on the wagering area a flag $X_2$ is set equal to 1 in step 412. Flag $X_2$ corresponds to a side wager of a second amount as will be explained below. On the other hand, when no wager is detected at the second wagering area, the flag $X_2$ is set equal to 0 in step 414.

In step 416, it is then determined whether wagers are simultaneously detected at more than one wagering areas. This may be done by monitoring an output from both wagering areas, or by determining that both of flags $X_1$ and $X_2$ are equal to 1. When a wager is detected at more than one wagering area simultaneously, then in step 418, flags $X_1$ and $X_2$ are set to 0, and a flag $X_3$ is set to 1. Flag $X_3$ corresponds to a side wager of a third amount as will be explained below. On the other hand, when wagers are not simultaneously detected at more than one wagering area, flag $X_3$ is set equal to 0 in step 420.

As mentioned above, the flags $X_1$, $X_2$, and $X_3$ correspond to different side wager values or whether a wager is placed for a particular award, event, or outcome. Accordingly, as a result of the monitoring of wagering areas, one or none of the flags $X_1$, $X_2$, and $X_3$ are set a value of 1. In step 422, it is determined which, if any, of flags $X_1$, $X_2$, and $X_3$ is equal to 1. If one of flags $X_1$, $X_2$, or $X_3$ is equal to one, than the corresponding side wager is accepted in step 424. For example, $X_1$ may correspond to a side wager of $5, $X_2$ may correspond to a side wager of $10, and $X_3$ may correspond to a side wager of $15. Thus, when the flag $X_1$ is equal to 1, the side wager of $5 is accepted. When flag $X_2$ is equal to 1, the side wager of $10 is accepted. And when flag $X_3$ is equal to 1, the side wager of $15 is accepted. On the other hand, if none of flags $X_1$, $X_2$, and $X_3$ are equal to one, then it is determined that no side wager has been placed by a player in step 426. It is noted that the above-described process may be ongoing during a time when players may place side wagers so that during that time, the players may change their side wagers if desired.

The first wager and the second wager may the same amount or they may be different amounts (in credits, chips, monies, points, etc.). As one example, the first and second wager might both be $5 (whereby the third wager is the sum of the first and second wagers, or $10). In another example, the first wager may be $5 and the second wager may be $10 (whereby the third wager is $15). Preferably, which wager the player has placed (and the value of that wager) is detected by the sensor(s) associated with the wagering areas 122, 124. As described above, the wagering areas 122, 124 may be configured to flash an LED or other light to indicate that a wager has been placed by the player.

In other embodiments, the third wager may be a value that other than the sum of the first and second wager. For example, the first and second wagers made be for wagers of $1 and $5 respectively. However, the third wager indicated by detecting a wager input to both wagering areas may be for $10 instead of the $6, or instead of the sum of the first and second wagers.

The wagering areas 122, 124 may detect the presence of casino chips, coins, or other objects representing a monetary value for a wager. This information may be reported to the table controller 210, which, in turn, reports the wagers to the award server 230. The wagering areas 122, 124 may also detect a wager from a player without such objects. For example, a player may press or touch the wagering areas 122, 124 to indicate that he or she wishes to make a side wager prior to the beginning of the game. The table controller 210 may then communicate via the casino network 220 with an accounting server to utilize the required number of credits from a player account for the side wager made by the player.

Returning to FIG. 3, once side wagers have been accepted from the player, the dealer, in step 304, preferably closes wagering via the deal interface 110. This may occur at the initiation of the table or base game. For example, the side wagering areas 122, 124 may flash during an attract or "place wagers" mode. The dealer may utilize the interface 110 to provide a "close wagers" input to the table controller which causes the table controller 110 to lock accepted wagers and cause the side wagering areas 122, 124 to turn off if no wager has been placed and to illuminate steadily if an associated wager has been placed. At that point, no additional supplemental wagers may be placed and existing supplemental wagers placed by the players may no longer be altered and are locked in. The side wagering areas 122, 124 may be configured to consistently activate an LED or other light to when a side wager is detected at the time that wagers are locked in by the dealer.

In step 306, the base or other game is played according to base game rules. In an embodiment where the base game is played with one or more base or main game wagers and have associated payouts, the outcome of the base game is determined according to the rules of the base game, preferably independent of the side or supplemental wager. It will be appreciated that the outcome of the base wager (such as via play of the base game) might be completed before or after resolution of the player's supplemental wagers (for example, the supplemental wager might be that a first card of a hand dealt to a player meets certain criteria, whereby the supplemental wager might be resolved upon dealing of the initial hand to the player and whereby the hand is then completed and the base wager is resolved).

In step 308, each player's side wager or supplemental wager (if the player placed a side wager) is resolved, such as in accordance with particular rules or criteria for the side wager. If the player lost the side wager opportunity, in a preferred embodiment their entire side wager is lost (i.e., no amounts are awarded or paid to the player). However, if the player won their side wager (e.g., met one or more winning criteria for the wager), then the player is preferably awarded the award which is associated with their wager.

If one or more of the players wins one of the supplemental wagers, a fanfare or similar animation may be presented, such as including sounds or images/graphics displayed on the table display 130 (of the table of that player and, in other embodiments, by announcing that the jackpot was won to players of other tables, such as via the displays of those tables) showing which player has won and the designated amount of the award.

The criteria for winning the side wager may vary. For example, the winning side wager criteria might be some of the same criteria for winning the base game or might comprise entirely different criteria. As one example, the base game might comprise a game of poker and the side wager might comprise a wager that the player will receive one of a predetermined number of winning poker hands. An example of a payout table for options of a first wager of $5, a second wager of $10, and a third wager of $15 wager is shown below as illustrative of but one implementation of the invention.

TABLE 1

| Winning Hand | $5 Jackpot Wager | $10 Jackpot Wager | $15 Jackpot Wager |
|---|---|---|---|
| Royal Flush | 100% of the $5 Jackpot Display Amount | 100% of the $10 Jackpot Display Amount | 100% of the $15 Jackpot Display Amount |
| Straight Flush | 10% of the $5 Jackpot Display Amount | 10% of the $10 Jackpot Display Amount | 10% of the $15 Jackpot Display Amount |
| Four of a Kind | $2,500 | $5,000 | $7,500 |
| Full House | $ 500 | $1,000 | $1,500 |

TABLE 1-continued

| Winning Hand | $5 Jackpot Wager | $10 Jackpot Wager | $15 Jackpot Wager |
|---|---|---|---|
| Flush | $250 | $500 | $750 |
| Straight | $125 | $250 | $375 |

In the above example, three different jackpots are associated with the different levels of side wagers. However, there may also be a single jackpot where the payouts may be for a different percentage of the single jackpot based on the wager amount.

The amount of the awards or jackpot(s) are preferably displayed on the display 130 of each table 100*a*-100*n*. Most preferably, where the side wagers are of different sizes, the size of the associate awards preferably vary. As one example, when the third supplemental wager is greater than the second supplemental wager and the second supplemental wager is greater than the first supplemental wager, then a third award (corresponding to the third supplemental wager) is preferably greater than a second award (corresponding the second supplemental wager), and the second award is preferably greater than the first award (corresponding to the first supplemental wager). Thus, when multiple level jackpots are utilized, the multi-level jackpots are configured such that an amount of the low-level jackpot is set to be lower than the mid-level jackpot and high-level jackpot, the amount of the mid-level jackpot is set to be lower than the high-level jackpot and higher than the low-level jackpot, and the amount of the high-level jackpot is set to be higher than the low-level and the mid-level jackpot.

In one embodiment, this may be achieved by awarding a player different portions of the same jackpot (such as 10% of the jackpot for the first supplemental wager, 50% of the jackpot for the second supplemental wager and 100% of the jackpot for the third supplemental wager). In another embodiment, there may be multiple jackpots where each jackpot is seeded and funded in a manner which achieves this configuration. As one example of one embodiment of the invention where there are two wagering areas which offer three wagers and three associated jackpots, the system might maintain three progressive pools or values, such as a low level pool A, a mid-level pool B and a high-level pool C. The low level jackpot corresponding to the first supplemental wager might be equal to the value of pool A, the mid-level jackpot corresponding to the second supplemental wager might be equal to the value of pools A+B, and the high-level jackpot corresponding to the third supplemental wager might be equal to the value of pools A+B+C. Aside from creating and tracking the individual pools, the system may cause the table displays to display the actual jackpot values which are created from those pools. As an example, if pool A had a value of $100, pool B a value of $200 and pool C a value of $500, the low-level jackpot would be displayed as $100, the mid-level jack would be displayed as $300, and the high-level jackpot would be displayed as $800.

As indicated, the system may offer different awards. Those awards may be fixed, such as comprising large value awards. In a preferred embodiment, the awards are progressive, i.e., the increase or grow over time. In one embodiment, progressive jackpots may be funded by all or a portion of each supplemental wager, which is placed by players. In order to achieve the characteristics described above where the jackpots have different values, portions of the different supplemental wagers might be utilized to fund different jackpots or may be allocated in different amounts, for example, 10% of each supplemental wager might go to a low-level jackpot, 30% to a mid-level jackpot, and 60% to a high-level jackpot, thus ensuring that the high-level jackpot grows faster (to higher amounts) than the mid-level jackpot and that the mid-level jackpot grows faster (and to higher amounts) than the low-level jackpot.

As indicated, while the invention can be implemented at a single table, in an embodiment wherein multiple tables 100*a*-100*n* are each connected to the jackpot award server 230, the amount in the progressive multi-level or single jackpot may increase quickly to a large amount, further incentivizing players to participate in the progressive side wagering system, and thus in the underlying base game. Because of the ability to decide an amount to wager based on the number of levels in the multi-level jackpot, the player has more control and options to offer a dynamic and exciting side wagering system. Further, because the side wagering areas 122, 124 allow the player to quickly and easily place the dynamic side wager for the progressive jackpot, the pace of play of the base game is largely unaffected.

The system, or elements thereof, may be associated with or communicate with other systems or devices. In one embodiment, for example, the table controller might communicate with a card scanner at the table, whereby the table controller receives information regarding cards dealt to the player(s), such as for verifying winning hands, etc.

It will be appreciated that the system may have various configurations. For example, in one embodiment the dealer may determine whether a player has received a winning outcome relative to a particular supplemental wager. The dealer may then utilize the dealer interface 110 to indicate to the table controller 210 that a winning outcome has occurred. The table controller 210 may then notify the award server 230 of the win. In other embodiments, the winning outcome might be processed by the award server 230. In certain embodiments, a supervisor might be required to verify or provide input to the dealer interface 110, table controller 210 or the like in order to designate a winning outcome to the system.

While in one preferred embodiment of the invention two wagering areas are utilized to implement three different wagering opportunities, other numbers of wagering areas or options may be implemented. For example, three wagering areas might be utilized, such as wagering areas A, B and C. Those three wagering areas might be utilized to implement as many as seven (7) different wagering options: A, B, C, A+B, A+C, B+C and A+B+C. Of course, additional numbers of wagering areas may be utilized, such as four (4) or more. It will also be appreciated that different wagering areas and wagering options might be implemented at different gaming tables of the same system. For example, gaming table 1 might offer two wagering areas associated with pools A, B and C which offer associated low, mid and high-level jackpots having values A, A+B and A+B+C, respectively, and gaming table 2 might offer two wagering areas associated with pools D, E and F which offer associated low, mid and high-level jackpots having values D, D+E and D+E+F.

The method and system disclosed herein may be implemented in a triple-up progressive system. TRIPLEUP PROGRESSIVE® is an optional progressive wager offered with wagering games including but not limited to Macau Stud, CRAZY 4 POKER®, THREE CARD POKER®, MISSISSIPPI STUD®, Texas Hold'Em Bonus, Ultimate Texas Hold'Em, LET IT RIDE®, FOUR CARD POKER®, or any other wagering game. In this embodiment players must play the underlying game to be allowed to play the optional progressive wager. To make a progressive wager, players can either use their Personal Bet Managers with pre-paid progressive wagers and chip sensor or with standard chips/tokens chip sensors located at their betting positions. The method of placing a wager will be decided by casinos. To use the Personal Bet Managers, players will give money either in chips or with currency to the dealer who will enter the amount into his keypad at the dealer interface. This amount will then be converted into units of different value, such as 50 units and 100 units groups (dollars, HKD, . . . or any other type) which the player can use to make a progressive wager from 1 through 3 units. To use the chip sensors, players can place 50 units in chips on the first chip sensor identified with a 50 sign or 100 units in chips on the second chip sensor identified with a 100 sign or HKD 50 units in chips on the first chip sensor and 100 units on the second chip sensor for a total of 150 units.

The TRIPLE UP PROGRESSIVE®may be played against a 5-card poker payout table or any type or size of hand. Participating players will win if their hand qualifies for a payout regardless of the outcome of their main game wager. The cards used to form their 5-card poker hand and compare against the payout table will change with the table game on which the bet is made.

In one embodiment, the TRIPLEUP PROGRESSIVE® features three progressive jackpots namely: (High, Medium and Low). A player making a 1 unit (or 50.00) wager will have access to the Low Level Jackpot. A player making a 2 units (or 100.00) wager will have access to the Medium Level Jackpot and a player making a 3 units (or 150.00) wager will have access to the High Level Jackpot.

The first unit (or the first 50.00) wagered by a participating player will contribute to the Low Level Jackpot. The second unit (or the second 50.00) wagered will contribute to the Medium Level Jackpot and the third unit (or the third 50.00) wagered will contribute to the High Level Jackpot. The amount displayed on each table's LCD screen for the Medium Level Jackpot will include the amounts accumulated in the Low and Medium Jackpot amounts. The amount are displayed on each table's LCD screen for the High Level Jackpot and will include the amounts accumulated in the Low, Medium and High Jackpot so that amounts to players and people passing by can view the amount that can be won. A participating player with a hand qualifying for a percentage prize will be awarded the posted percentage of his jackpot level and all lower jackpots. For example, a player who made a 3 units wager (amounts wagered at each wager area) and who is dealt a hand paying 10% of the progressive is awarded 10% of the High, Medium and Low Jackpots. In this embodiment this will be the same as 10% of the High Level jackpot as posted on the table's LCD screen.

In this embodiment the jackpot and jackpot meters are re-seeded when a 100% award hits. Once all players have placed their bets, the dealer will then press "START" on the dealer keypad. The players' personal bet manager and/or chip sensors associated with the player area will then be locked during the round. The dealer then follows house procedures for dealing the regular game. After reconciling standard wagers, the dealer may then, in this embodiment, reconcile the optional progressive wagers in a counter-clockwise manner, starting with the player furthest to his right.

The game and method of play may have fixed prizes and/or progressive prizes. These prizes are multiplied by the number of credits the player wagered on the winning hand. At the casino's discretion, the fixed prizes won by players can either be paid directly to the winning player's personal bet management system or paid with chips from the rack. For Progressive Prizes in the event that more than one top progressive prize pay hits during the same round, casinos will have the option to either pay the full meter proportionally to the number of credits wagered by each winning player or pay each prize sequentially according to the usual order in which the dealer resolves the player's hands. This may be left to the casino's discretion. When a player hits a progressive prize, the dealer may key in the prize to lock the amount. At the end of the hand, the dealer presses or otherwise stops the system. This unlocks the personal bet manager and chip sensors.

Figure 5:
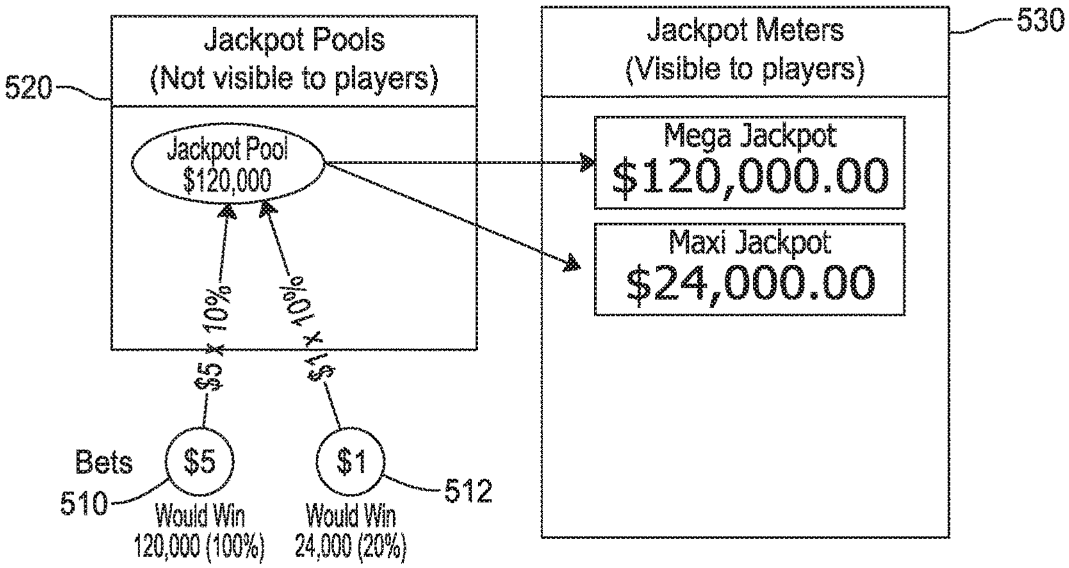
FIG. 5 illustrates a method of conducting a progressive jackpot according to one embodiment.

FIG. 5 illustrates a method of conducting a progressive jackpot according to one embodiment. In this embodiment, a player may utilize the wagering areas 122, 124 to make a side wager for a progressive jackpot as a top prize (the remainder of the prizes are fixed amounts in a pay table). In this example, a high wager 510 of $5 and a low wager 512 of $1 are presented as options for the player. However, the wager values may be different, and other options for side wagers may also be presented (e.g., low, medium, and high wager).

In this embodiment, both the high wager 510 and the low wager 512 fund and are paid out of the same jackpot pool 520. That is, when a player makes the low wager 512, the low wager 512 funds the jackpot pool 520, and when the player makes the high wager 510, the high wager 510 also funds the jackpot pool 520.

In this embodiment, the payout for the high wager is the entire amount currently in the jackpot pool 520. The payout for the low wager is a percentage of the jackpot pool 520. Both of these awards may be shown on a jackpot meter display 530. When a player who has wagered the low wager wins the progressive jackpot, the award is paid to the player, and jackpot pool 520 is decreased according to the payout. The jackpot meter display 530 is updated so that the awards displayed for both the high and the low values reflect the current balance in the jackpot pool 520. It is contemplated that each coin-in/bet may be divided into the following three categories in any percentage or division: (1) reserve (funds from here are used to re-seed); (2) increment the meter; and (3) casino profit. Various reseed amounts are also contemplated so that the jackpot is re-seeded to a value other than zero to encourage play by players even after a jackpot win by another player.

When a player who has wagered the high wager wins the progressive jackpot, the player is awarded the full amount in the jackpot pool 520. The jackpot pool 520 is then reseeded, and the new amounts for both the high and low progressive jackpot are shown in the jackpot meter display 530. Of course, if more than two wagering options are provided, each corresponding jackpot balance may be displayed on the jackpot display 530.

In some embodiments, other awards are also possible. For example, different game outcomes may result in only a percentage of the high and low jackpot being awarded. The high and low wagers may also be awarded fixed awards based on certain game outcomes in addition to the progressive jackpot awards. The progressive jackpot system may be implemented on any number of base game including but not limited to THREE CARD POKER®, CRAZY 4 POKER®, CARIBBEAN STUD® Poker, FOUR CARD POKER®, MISSISSIPPI STUD®, LET It RIDE®, etc.

With the progressive jackpot described above, the players have an option for making either wager, and the jackpot pool grows regardless of which wager the player chooses. Further, according to these embodiments, the high jackpot will always be proportionately higher than the low jackpot.

Figure 6:
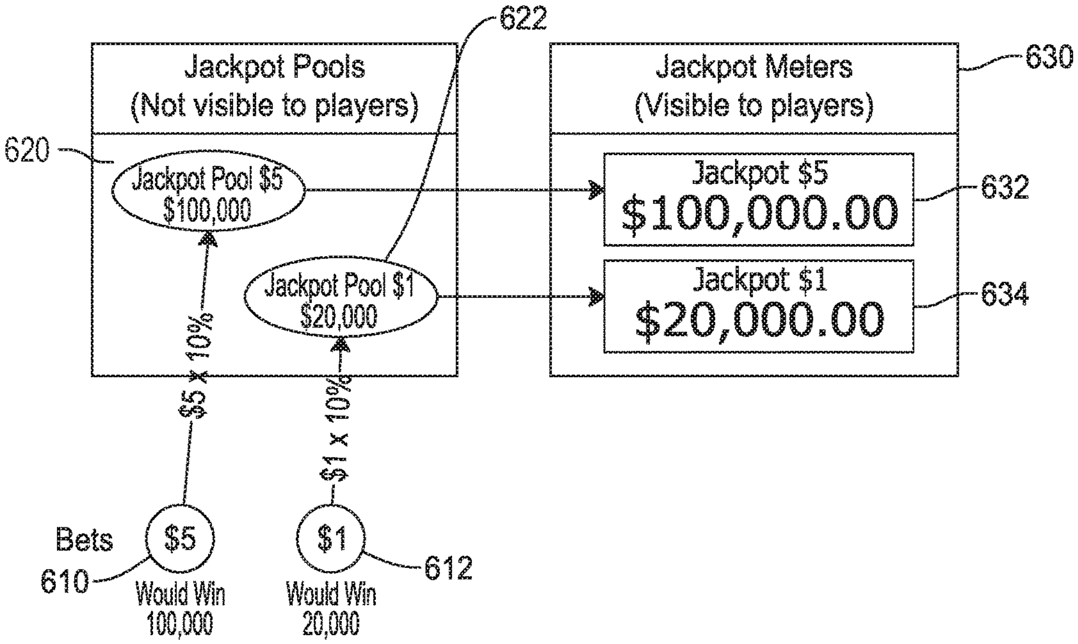
FIG. 6 illustrates another method of conducting a progressive jackpot according to one embodiment.

FIG. 6 illustrates a method of conducting a progressive jackpot according to one embodiment. In this embodiment, a player may utilize wagering areas 122, 124 to make a side wager for a progressive jackpot. In this example, a high wager 610 of $5 and a low wager 612 of $1 are presented as options for the player. However, the wager values may be different, and other options for side wagers may also be presented (e.g., low, medium, and high wager).

In this embodiment, the high wager 610 funds a high jackpot pool 620, and the low wager 612 funds a separate, low jackpot pool 622. Accordingly, when a player who wagered the high wager 610 wins an award, the player is paid a portion or all of the high jackpot pool 620. Similarly, when a player who wagered the low wager 612 wins an award, the player is paid a portion or all of the low jackpot pool 622. A jackpot meter display 630 displays a current high jackpot balance display 632 and a low jackpot balance display 634 based on the current balances of the high jackpot pool 620 and the low jackpot pool 622. When a player wins all of the high jackpot pool 620 or the low jackpot pool 622, the jackpot pool is reseeded.

In this embodiment, the individual jackpot pools are unaffected by the other jackpot pools. That is, a player wagering in or winning from the high jackpot pool 620 will not affect a player wagering in or winning from the low jackpot pool 622.

Figure 7:
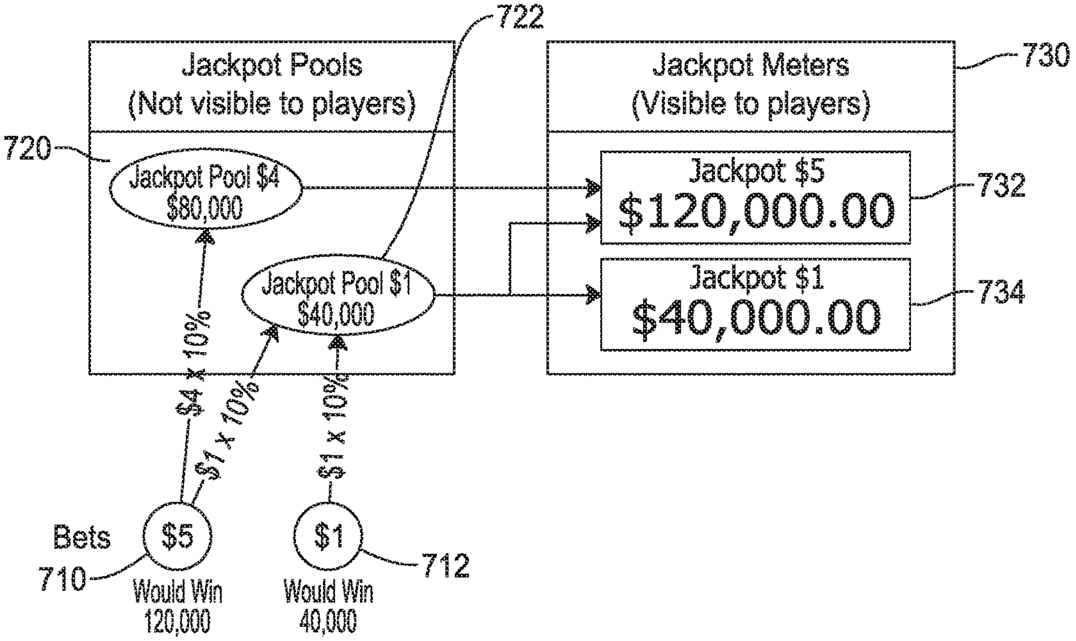
FIG. 7 illustrates another method of conducting a progressive jackpot according to one embodiment.

FIG. 7 illustrates a method of conducting a progressive jackpot according to one embodiment. In this embodiment, a player may utilize wagering areas 122, 124 to make a side wager for a progressive jackpot. In this example, a high wager 710 of $5 and a low wager 712 of $1 are presented as options for the player. However, the wager values may be different, and other options for side wagers may also be presented (e.g., low, medium, and high wager).

In this pot, the individual jackpot pools 720, 722 are linked. A wager from a player making the high wager 710 is used to fund both the high jackpot pool 720 and the low jackpot pool 722. In this example, 10% of $4 out of the $5 wager goes towards the high jackpot pool 720, and 10% of $1 out of the $5 wager goes toward the low jackpot pool 722. In other embodiment, other wager division schemes may be used without departing from the claims appended. A wager from a player making the low wager 712 goes toward the low jackpot pool 722.

A jackpot meter display 730 displays current jackpot amounts for a high jackpot win balance 732 and a low jackpot win balance 734. Here, the high jackpot win balance 732 is the combined total of the high jackpot pool 720 and the low jackpot pool 722. Thus, if a player wins the whole high jackpot win balance 732, both of the high jackpot pool 720 and the low jackpot pool 722 are reseeded. When a player wins the low jackpot win balance 734, only the low jackpot pool is reseeded. However, the high jackpot win balance 732 is updated to reflect the sum of the high jackpot pool 720 and the reseeded low jackpot pool 722.

In this embodiment, because the jackpot pool 720, 722 are linked, the jackpots move even in players are only making one of the high or low wagers 710, 712. Further, in this embodiment it is impossible to have a situation where the amount of the high jackpot award is lower than the low jackpot award.

Figure 8:
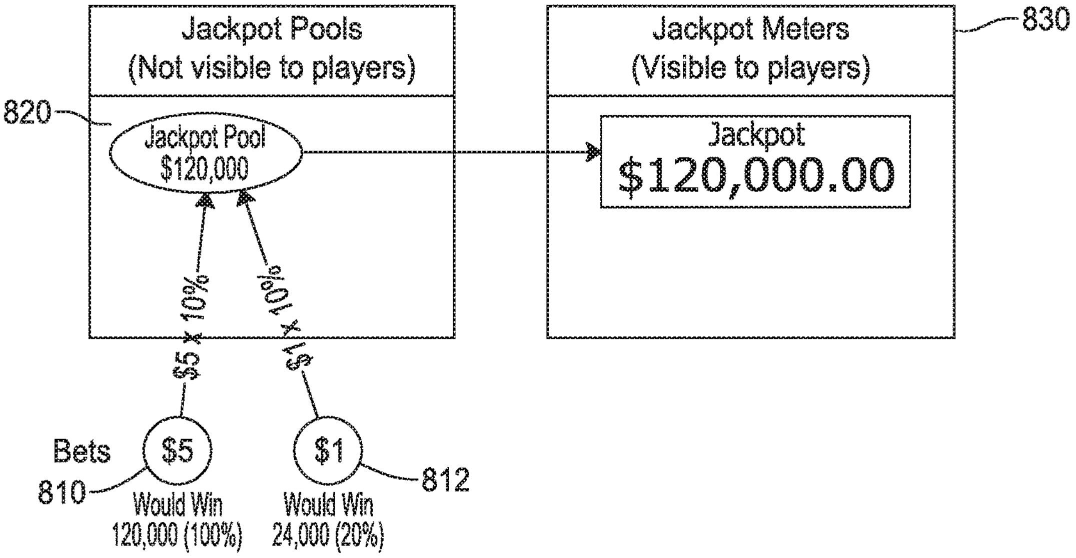
FIG. 8 illustrates another method of conducting a progressive jackpot according to one embodiment.

FIG. 8 illustrates a method of conducting a progressive jackpot according to one embodiment. In this embodiment, a player may utilize wagering areas 122, 124 to make a side wager for a progressive jackpot. In this example, a high wager 810 of $5 and a low wager 812 of $1 are presented as options for the player. However, the wager values may be different, and other options for side wagers may also be presented (e.g., low, medium, and high wager).

In this embodiment, a player may wager to receive a percentage of a jackpot pool 820. The amount of the jackpot pool 820 is displayed on a jackpot meter display 830. Here, multiple wagers that are a fractional amount may easily be incorporated into the game. The players are paid a fractional amount of the award corresponding to the fractional value of their wager as compared to the high wager. In this example, if the player wagered $1 and the high wager is $5, the player would receive 20% of the award. Similarly, if the player wagered $2, then the player would receive 40% of the award, and so on. In this manner, a flexible betting arrangement may be presented to the user where the use may choose what value to wager up to the high wager.

The method and system disclosed herein may be implemented with a bonusing system available from DEQ Systems Corp. located in Quebec, Canada and may have the tradename G3 ® platinum electronic table games bonusing system. When a table is equipped with a G3 ® system, players continue to play the underlying game(s) while they can place side wagers on the system for a chance to win significant progressive jackpots and a whole variety of high frequency, low payout prizes that keep player satisfaction and retention at a high level. Multiple tables can be interconnected together to feed a progressive jackpot awarded on predetermined winning hand(s). With such a system numerous benefits are realized including providing a highly secure automation of any manual side bet, limiting errors and fraud; Progressive jackpots management; Random prizes generated by the system; Extensive accounting and report features; Possibility to place a bet on the player's or the dealer's hand; Multi-bet credit based side betting; Optional hot spot side wager using casino chips; Attractive LCD screen with visual and sound effects. The personal bet managers (PBMs) are the interfaces used by the players to place their side wager. The player buys credits from the dealer and once they are available in his credit bank, he can place a bet using the player or dealer buttons. Progressives across multiple tables and different types of games may occur using this system.

Using the personal bet managers (PBMs) the players may play the underlying game to be allowed to play the side bet. They can place a side bet on their own hand or on the dealer's hand using their personal bet managers (PBMs). Players can also place a casino chip of $1 on their hot spot to participate to the side bet on their own hand. For the player to participate in a side bet with its bet manager, he must first buy in (purchase credits) from the dealer. The dealer will then enter the credits into his keypad, and the credits will appear in the player's credit bank. The player can then push the "player" or "dealer" buttons to place a side bet on either hand or both hands outcome, based on game options. The player can also simply place a $1 casino chip on one or more wager areas or hot spots to participate to the side bet on its own hand for 1 credit.

Figure 9:
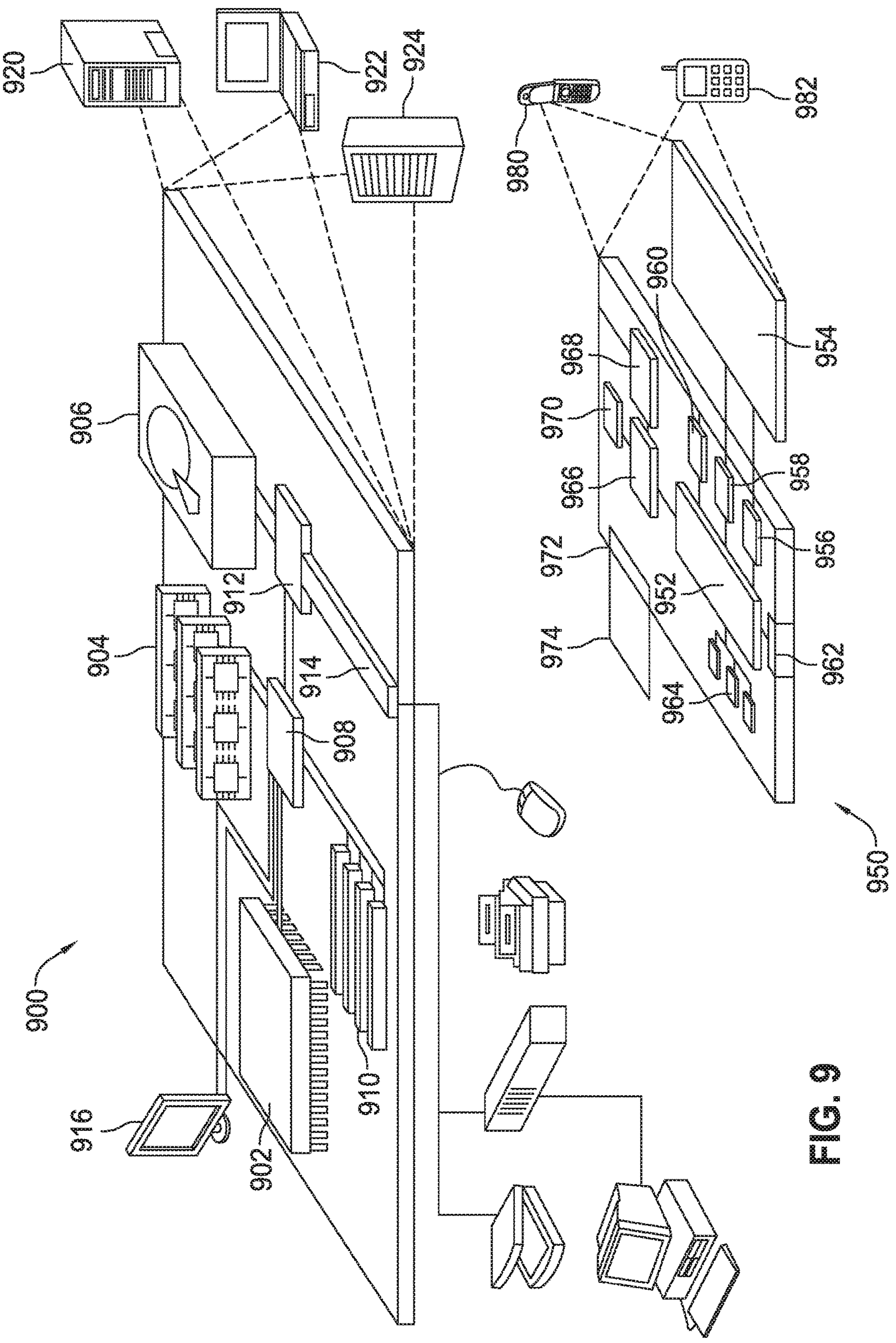
FIG. 9 illustrates exemplary hardware for a server or controller implementing a multi-level jackpot system.

FIG. 9 is a block diagram showing example or representative computing devices and associated elements that may be used to implement the systems, method and apparatus described herein. FIG. 9 shows an example of a generic computing device 900 and a generic mobile computing device 950, which may be used with the techniques described here. Computing device 900 is intended to represent various forms of digital computers, such as laptops, desktops, workstations, personal digital assistants, servers, blade servers, mainframes, and other appropriate computers.

Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface or controller 908 connecting to memory 904 and high-speed expansion ports 910, and a low-speed interface or controller 912 connecting to a low-speed bus 914 and the storage device 906. Each of the components 902, 904, 906, 908, 910, and 912, are interconnected using various buses and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed controller 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disc.

The storage device 906 is capable of providing mass storage for the computing device 900. In one implementation, the storage device 906 may be or contain a computer-readable medium, such as a floppy disk device, a hard disk device, an optical disc device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed interface or controller 908 manages bandwidth-intensive operations for the computing device 900, while the low-speed interface or controller 912 manages lower bandwidth-intensive operations. Such allocation of functions is exemplary only. In one implementation, the high-speed interface or controller 908 is coupled to memory 904, display 916 (e.g., through a graphics processor or accelerator), and to high-speed expansion ports 910, which may accept various expansion cards (not shown). In the implementation, low-speed interface or controller 912 is coupled to storage device 906 and low-speed bus 914. The low-speed bus 914, which may include various communication ports (e.g., USB, BLUETOOTH®, ETHERNET®, wireless ETHERNET®) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as computing device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The computing device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor 952 may be implemented as a chipset of chips that include separate and multiple analog and digital processors. The processor 952 may provide, for example, for coordination of the other components of the computing device 950, such as control of user interfaces, applications run by computing device 950, and wireless communication by computing device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of computing device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to computing device 950 through expansion interface 972, which may include, for example, a SIMM (Single In-Line Memory Module) card interface. Such expansion memory 974 may provide extra storage space for computing device 950, or may also store applications or other information for computing device 950. Specifically, expansion memory 974 may include instructions to carry out or supplement the processes described above, and may include secure information also. Thus, for example, expansion memory 974 may be provided as a security module for computing device 950, and may be programmed with instructions that permit secure use of computing device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on a processor 952, that may be received, for example, over a transceiver 968 or external interface 962.

Computing device 950 may communicate wirelessly through communication interface 966, which may include digital signal processing circuitry where necessary. Communication interface 966 may provide for communications under various modes or protocols, such as GSM voice calls, SMS™, EMS, or MMS messaging, CDMA, TDMA, PDC, WCDMA, CDMA2000®, or GPRS, among others. Such communication may occur, for example, through a radio-frequency transceiver 968. In addition, short-range communication may occur, such as using a BLUETOOTH®, WiFi, or other such transceiver (not shown). In addition, GPS (Global Positioning system) receiver module 970 may provide additional navigation- and location-related wireless data to computing device 950, which may be used as appropriate by applications running on computing device 950.

Computing device 950 may also communicate audibly using audio codec 960, which may receive spoken information from a user and convert it to usable digital information. Audio codec 960 may likewise generate audible sound for a user, such as through a speaker, e.g., in a handset of computing device 950. Such sound may include sound from voice telephone calls, may include recorded sound (e.g., voice messages, music files, etc.) and may also include sound generated by applications operating on computing device 950.

The computing device 950 may be implemented in a number of different forms, as shown in the figure. For example, it may be implemented as a cellular telephone 980. It may also be implemented as part of a smartphone 982, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium" refer to any computer program product, apparatus and/or device (e.g., magnetic disks, optical discs, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 900 and/or 950) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 900 and 950 are configured to receive and/or retrieve electronic documents from various other computing devices connected to computing devices 900 and 950 through a communication network, and store these electronic documents within at least one of memory 904, storage device 906, and memory 964. Computing devices 900 and 950 are further configured to manage and organize these electronic documents within at least one of memory 904, storage device 906, and memory 964 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the appended claims.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A side wagering system comprising:

a game table having a dealer interface and at least one player interface, the at least one player interface comprising two or more wagering areas including a first wagering area and a second wagering area with each wagering area having a wager detector that generates a wager signal when a side wager has been placed by a player at a respective wagering area;

a table controller, associated with the game table, configured to receive a first wager signal from the wager detector at the first wagering area and a second wager signal from the wager detector at the second wagering area, the first wager signal and second wager signal indicating whether a player placed a wager at the wagering areas; and a progressive jackpot server in communication with the table controller, the progressive jackpot server comprising a memory and being programmed to:

add a value of a first wagering opportunity to a first, distinct jackpot pool when the wager detector of the first wagering area generates a wager signal and the wager detector of the second wagering area does not generate a wager signal and pay a first jackpot of a first value from the first jackpot pool when a winning outcome occurs;

add a value of a second wagering opportunity to a second, distinct jackpot pool when the wager detector of the first wagering area does not generate a wager signal and the wager detector of the second wagering area generates a wager signal and pay a second jackpot of a second, intermediate value from the second jackpot pool when a winning outcome occurs; and add a value of a third wagering opportunity to a third, distinct jackpot pool when the wager detector of the first wagering area generates a wager signal and the wager detector of the second wagering area generates a wager signal and pay a third jackpot of a third, greatest value from the third jackpot pool when a winning outcome occurs.

2. The side wagering system in accordance with claim 1, wherein the value of the third wagering opportunity is of an amount that is greater than the value of the second wagering opportunity, and the value of the second wagering opportunity is of an amount that is greater than the value of the first wagering opportunity.

3. The side wagering system in accordance with claim 2, wherein the first, second, and third jackpots comprise portions or all of the respective first, second, and third jackpot pools.

4. A gaming system comprising:

a gaming table configured for game play of a wagering game, the gaming table comprising:

a table controller that includes a processor for executing machine readable instructions and at least one memory;

at least a first wagering areas area and a second wagering area, the at least a first wagering area and a second wagering area, each comprising a wager detector communicatively coupled to the table controller, the wager detector determining when a side wager has been placed by a player at any of the respective wagering areas;

the table controller configured to determine whether the player placed a wager at one of the at least two wagering areas via information received from the wagering areas; and a progressive jackpot controller comprising a processor and a memory and being programmed to:

add a value of a first wagering opportunity to a first, distinct jackpot pool when the wager detector of the first wagering area generates a wager signal and the wager detector of the second wagering area does not generate a wager signal and pay a first jackpot of a first value from the first jackpot pool when a winning outcome occurs;

add a value of a second wagering opportunity to a second, distinct jackpot pool when the wager detector of the first wagering area does not generate a wager signal and the wager detector of the second wagering area generates a wager signal and pay a second jackpot of a second, intermediate value from the second jackpot pool when a winning outcome occurs; and add a value of a third wagering opportunity to a third, distinct jackpot pool when the wager detector of the first wagering area generates a wager signal and the wager detector of the second wagering area generates a wager signal and pay a third jackpot of a third, greatest value from the third jackpot pool when a winning outcome occurs.

5. The gaming system of claim 4, further comprising at least one display, the display being configured to present award information corresponding to the first, second, and third jackpot pools.

6. The gaming system of claim 4, wherein each respective wagering area further comprises at least one of a visual and audio indicator, the at least one of the visual and audio indicator providing a first feedback indication that a side wager has been detected and a second feedback indication that a side wager has been locked in for a wagering game.

7. The gaming system of claim 6, wherein the at least one visual and audio indicator comprises one or more LED lights.

* * * * *